United States Patent [19]

Westerman

[11] 3,849,308

[45] Nov. 19, 1974

[54] APPARATUS FOR SKIMMING FLOATING POLLUTION FROM A LIQUID SURFACE

[76] Inventor: Hulan Westerman, P.O. Box 118, Boothville, La. 70038

[22] Filed: Oct. 25, 1972

[21] Appl. No.: 300,601

[52] U.S. Cl.............. 210/98, 210/DIG. 21, 210/122, 210/242
[51] Int. Cl....................... B01d 33/38, E02b 15/04
[58] Field of Search ........ 210/83, 242, DIG. 21, 97, 210/98, 122

[56] References Cited
UNITED STATES PATENTS

| | | | |
|---|---|---|---|
| 2,330,508 | 9/1943 | McColl | 210/242 |
| 2,608,300 | 8/1952 | Small | 210/242 |
| 3,706,382 | 12/1972 | Cross | 210/242 |

Primary Examiner—Theodore A. Granger
Attorney, Agent, or Firm—James B. Lake, Jr.

[57] ABSTRACT

A container is floatably supported on a liquid surface between exterior floats fixed intermediate the container's oppositely disposed ends. The container has a closed bottom and the oppositely disposed ends are respectively an open shallow end and a deep end. An interior float is adjustably fixed in the open shallow end. A suction pipe line is fixed in the container approximately equidistant from the oppositely disposed ends, and with a suction end spaced vertically above the bottom of the container for continuously discharging liquid contents of the container above said suction end. The interior float is weighted to submerge the open shallow end of the container and raise the deep end when the liquid contents has been reduced by discharge from the suction pipe line to approaching the suction end thereof. The interior float is adjustably buoyant to raise the submerged open shallow end and lower the deep end of the container when its contents are increased and raised by the submergence to approach overflowing the container. The raising and lowering of the container's oppositely disposed ends is automatic and causes a back and forth flow of its contents to dissolve soluble solids and carry insoluble solids past said suction end of the suction pipe line and thereby prevent their entry into or collection around the suction end to stop or slow the continuous discharge of liquid contents from the container. The frequency of the rocking motion of the container is self-regulating and is a function of the weight and adjustable buoyancy of the interior float, and the rate of continuous discharge from the container.

2 Claims, 3 Drawing Figures 3,849,308

APPARATUS FOR SKIMMING FLOATING POLLUTION FROM A LIQUID SURFACE

The invention relates to liquid surface skimmers and more particularly to automatic, self-regulating apparatus for and method of skimming floating pollution from a liquid surface.

It is old in the art to provide a float for the suction end of a suction pipe line to float it near the surface for sucking up floating pollution thereon. However such a suction end and suction pipe line is soon plugged up with floating debris if the end is not screened, and if a screen is installed, floating debris collects thereon and there around and must be periodically removed.

It is an object of the invention to provide a skimmer in which soluble floating solids are circulated to bring them into solution, and insoluble floating solids are also circulated to prevent their collection in and around the suction end of a suction pipe line.

Another object of the invention is to provide self-regulating, back and forth, automatic circulation of a liquid surface adjacent a suction end of a suction pipe line.

Other objects and a more complete understanding of the invention may be had by referring to the accompanying description, claims and drawings, in which:

Figure 1:
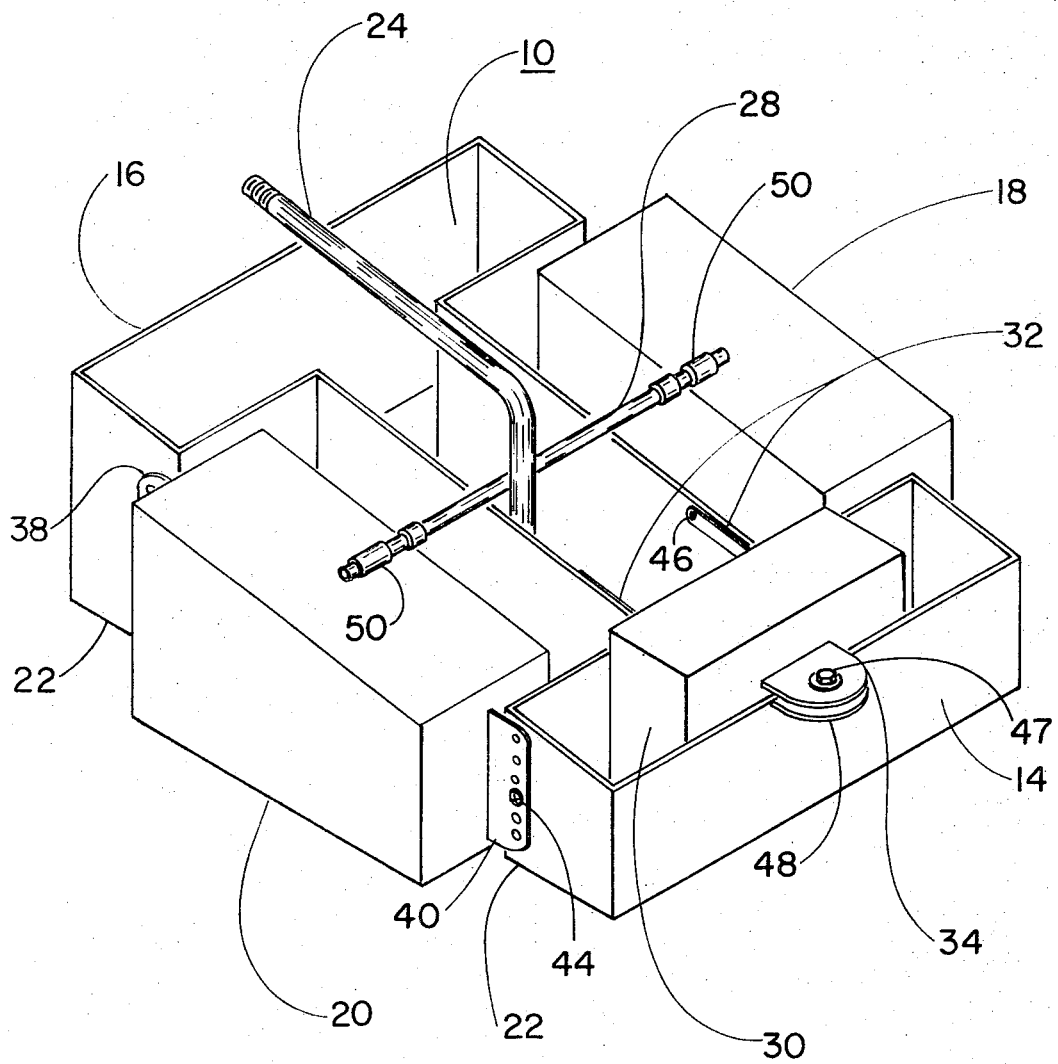
FIG. 1 is an isometric view of the skimming apparatus of the invention.
Figure 2:
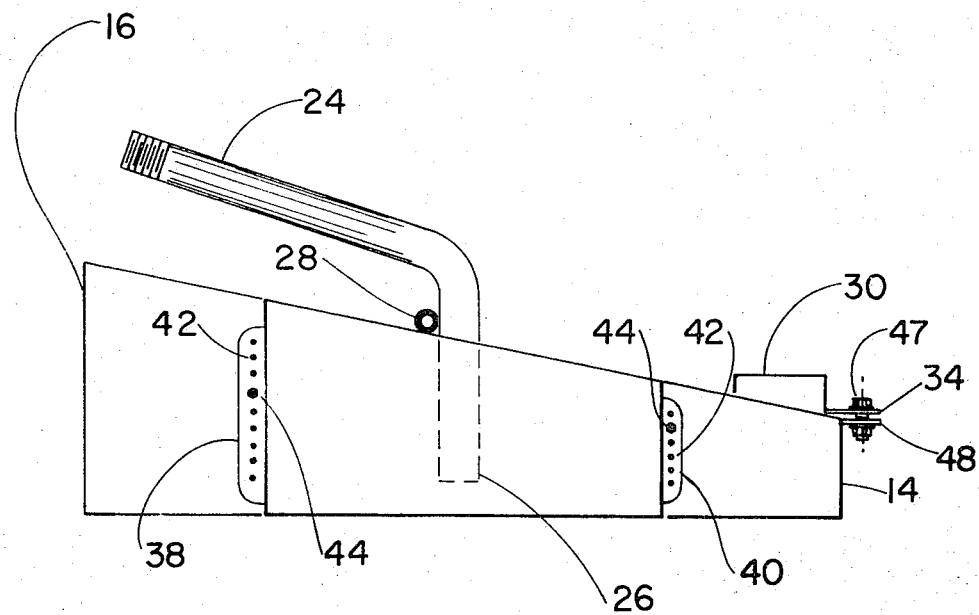
FIG. 2 is a side view of the apparatus illustrated in FIG. 1.
Figure 3:
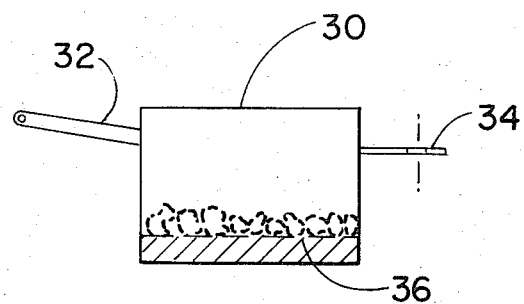
FIG. 3 is an enlarged side view of a partially concealed part in FIGS. 1 and 2.

Referring to FIGS. 1 and 2 the invention comprises a container 10 having a flat bottom 12 and oppositely disposed ends 14 and 16, respectively a shallow open end 14 and a deep end 16, said container for periodically receiving similar quantities of surface liquid in which it is floatably supported. Exterior floats 18 and 20 are fixed by their ends to opposite sides 22, which are partially recessed to receive them. A suction pipe line 24 with its suction end 26 vertically spaced above bottom 12 is fixed to center cross-brace 28 for continuously discharging liquid contents of container 10. An interior float 30, having a buoyancy variable with its position, the quantity of surface liquid in container 10, and its trim, is fixed by braces 32 and semi-circular flange 34 in the open shallow end 14 of container 10. The interior float 30 is also weighted to submerge shallow open end 14 when the buoyancy of float 30 is reduced by the reduction of the liquid contents of container 10 by the continuous discharge of exhaust line 24 to just exceeding the vertical spacing of suction end 26 above bottom 12, and to raise open shallow end 14 when its buoyancy is increased by an increase of its container's contents to approach but not exceed the depth of shallow open end 14.

Exterior floats 18 and 20 are mirror images and conform in shape to the sides 22 of the container 10. Flanges 38 and 40 are fixed to the respective ends of both floats and define a vertical arrays of hole 42, any pair of which may register with a pair of holes in side 22 and secured thereto by bolts 44. The fastening holes allow compensation for different viscosities of surface liquids.

Interior float 30 is adjustably fixed in open shallow end 14 of container 10 by pivot pins 46 at the ends of braces 32 and a spacing bolt 47 engaging through semi-circular flange 34 fixed to interior float 30 and a similar semi-circular flange 48 fixed to open shallow end 14.

The cross-brace 28 is connected to exterior floats 18 and 20 by bushings 50 to allow the cross-brace to rotate with respect thereto and thus allow the oppositely disposed ends of container 10 to rise and fall without disturbing the fixed suction pipe line 24.

In operation, the free end of suction pipe line 24 is connected to an exhaust pump conveniently mounted for its discharge end to empty elsewhere than back into the liquid surface on which the invention is floating. The invention is then placed on the liquid surface desired skimmed of surface pollution. The open shallow end 14 is immediately submerged by the weight of interior float 30 and surface liquid flows into container 10. As soon as the contents of the container approaches overflowing the buoyancy of interior float 30, increased by the flow, raises open shallow end 14 clear of the liquid surface and lowers the deep end 16 to flow container contents past suction end 26 of the suction pipe line 24 to the deep end. This flow prevents the entry of solids into suction pipe line 24 and the congregation of solids around suction end 26, even though both are cooperating to continuously reduce the contents of container 10. When the reduction of contents approaches suction end 26, buoyancy of interior float 30 is less than its weight and the open shallow end 14 is again submerged and the deep end raised to reverse flow of container contents which is immediately reversed again by a fresh entry of surface liquid from the submerged shallow end, and the process is repeated until the invention is removed from the liquid surface or it disappears.

Thus it is seen container 10 is rocked about its transverse axis to simultaneously raise and lower its oppositely disposed ends in alternate sequence to periodically receive discrete amounts of surface liquid which is kept in constant motion while being continually discharged from the container. The constant motion of container's contents causes soluble solids to enter into solution and insoluble solids to flow past and not into suction pipe line or congregate around its suction end. The frequency of the rocking movement can be set by relatively adjusting the buoyancy or position of interior float 30 in the shallow end of container and the weight of said float with the rate of discharge from said suction pipe line.

What is claimed is:

1. A rocking skimmer for collecting liquid from the surface of a body of water and comprising in combination:

a. an open-topped rigid container means, having walls extending upwardly from a closed horizontal bottom, for floating on said body of water and for collecting liquid from the surface thereof, said walls including end walls and side walls with one of said end walls being of less height than a second opposing end wall for the rapid submergence of said one end wall, and said side walls being constructed and arranged to provide said container means with greater width adjacent said end walls and a constriction therebetween for increasing the rate of flow of collected liquid through said constriction;

b. first flotation means exteriorly secured to said container means for keeping it afloat when filled with collected liquid and rockable about an axis transverse said constriction and the side walls of said container means;

c. second flotation means, having weight and buoyancy, interiorly secured in said container means adjacent said one end wall for said weight to rockably submerge said one end wall below the surface of said body of water and collect liquid therefrom over said one wall, and for said buoyancy responsive to said collected liquid, to rockably raise said submerged one end wall and flow said collected liquid oppositely therefrom to further raise said one end wall clear of the surface of said body of water; and d. suction pipe means, having an open inlet, pivotally mounted on said transverse axis and in said container means adjustably above said bottom whereby said increased rate of flow of collected liquid through said constriction keeps said open inlet free of solids and stoppage thereby, and for the controlled discharge of said collected liquid therefrom to vary buoyancy relative to said weight of said second flotation means and thereby resubmerge said one end wall and recommence collection of surface liquid, and so on to continuously and rockably skim the surface of said body of water.

2. A rocking skimmer as described in claim 1 wherein said first and second floatation means secured to and in said container means are adjustable in height relative to the bottom of said container means, said second flotation means being also adjustable in weight, and the discharge of said suction pipe means being adjustable in rate of flow whereby the frequency of rocking of said container means is a function of the coordination of said adjustments.

* * * * *